(12) United States Patent
Fukuda

(10) Patent No.: US 6,439,354 B2
(45) Date of Patent: Aug. 27, 2002

(54) JOINT CONSTRUCTION FOR BRAKE PIPE

(75) Inventor: Takashi Fukuda, Hamamatsu (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 0 days.

(21) Appl. No.: 09/844,778

(22) Filed: Apr. 27, 2001

(30) Foreign Application Priority Data

Apr. 28, 2000 (JP) .......................... 2000-129351

(51) Int. Cl.$^7$ ................................. B60T 17/04

(52) U.S. Cl. ................... 188/152; 188/151 R

(58) Field of Search .................. 188/152, 151 R, 188/151 A; 303/1; 138/103, 106, 111, 107; 285/18, 62, 60; 180/89.1, 297, 90; 296/121, 194

(56) References Cited

U.S. PATENT DOCUMENTS 2,062,449 A * 12/1936 Dick .......................... 188/152

* cited by examiner

Primary Examiner—Douglas C. Butler
(74) Attorney, Agent, or Firm—Alston & Bird LLP

(57) ABSTRACT

An object of the present invention is to increase the degree of freedom in laying out vehicle parts by decreasing a space in which a brake pipe is laid out. A control unit of a foot parking brake in accordance with the present invention is installed to an attachment bracket fixed to a dash panel, a connection joint is provided in a space between the dash panel and the foot parking brake, and the connection joint is installed to the dash panel. A cabin-side connector of the connection joint is disposed so as to face to the direction in which the dash panel extends. An outside connector of the connection joint is disposed so that one end of an outside brake pipe is disposed so as to be substantially perpendicular to the direction in which the surface of the dash panel extends.

4 Claims, 9 Drawing Sheets

JOINT CONSTRUCTION FOR BRAKE PIPE

BACKGROUND OF THE INVENTION AND RELATED ART STATEMENT

1. Field of the Invention

The present invention relates to a joint construction for a brake pipe disposed through a panel such as a dash panel.

2. Description of Related Art

FIGS. 7 and 8 show a connection joint for a brake pipe disposed through a dash panel. FIG. 9 is a route view of the brake pipe.

On a vehicle on which an engine room is arranged on the front side of a cabin through a dash panel, a master cylinder and a brake booster are disposed on the engine room side. Contrarily, on a vehicle on which an engine room is not provided at the front part of a vehicle body, such as a cab over type vehicle, in some cases, a master cylinder 51 and a brake booster 52 are disposed under an instrument panel, not shown, on the cabin side as shown in FIG. 9.

Therefore, brake pipes 53 connected to the master cylinder 51 for giving a liquid pressure to a brake system are divided into brake pipes 57 on the inside of a cabin (IN side) and brake pipes 58 on the outside of the cabin (OUT side). The brake pipes 57 on the inside of the cabin and the brake pipes 58 on the outside of the cabin are connected to a connection joint 56 installed in a through hole 55 formed in a dash panel 54 shown in FIG. 8, by which the brake pipes 57 and 58 are caused to communicate with each other.

The connection joint 56 is provided with a mounting flange 59 in an intermediate portion thereof. After the face of the mounting flange 59 is lapped on the IN-side surface of the dash panel 54 with a packing 60 held therebetween, the mounting flange 59 is fixed to the dash panel 54 by using bolts 61 and nuts 62. After the connection joint 56 is mounted to the dash panel 54, the brake pipes 57 and 58 are connected to the connection joint 56.

As shown in FIG. 8, the connection joint 56 has an IN-side connector 63 for the brake pipes 57 and an OUT-side connector 64 for the brake pipes 58, which are disposed coaxially with each other and substantially perpendicularly to the dash panel 54. Therefore, since the brake pipes 57 and 58 extend in the direction perpendicular to the surface of the dash panel 54, a wide space is needed to lay out the brake pipes 57 and 58. For this reason, it is difficult on a design basis to secure a space necessary for laying out other vehicle parts.

OBJECT AND SUMMARY OF THE INVENTION

The present invention has been made in view of the above situation, and an object thereof is to provide a joint construction for a brake pipe, which is capable of increasing the degree of freedom in laying out vehicle parts by decreasing a space in which a brake pipe is laid out.

To achieve the above object, the present invention provides a joint construction for a brake pipe, comprising a pipe joint which penetrates a vehicle body panel for separating a cabin from the outside of the cabin and is installed to the vehicle body panel; and brake pipes connected to a cabin-side connector of the pipe joint and an outside connector thereof, wherein of the cabin-side connector and the outside connector of the pipe joint, at least either one of the connectors is provided so as to face to the direction parallel with the vehicle body panel, and the brake pipe connected to the connector is disposed along the surface of the vehicle body panel.

Also, in the present invention, the vehicle body panel is a dash panel, the cabin-side connector of the pipe joint is provided so as to face to the direction parallel with the dash panel and the dash panel is provided with a control unit of a foot parking brake, and a space is provided between the dash panel and the control unit, whereby the pipe joint can be installed to the dash panel so as to be located in the space. Further, the pipe joint is formed into an L shape in cross section so that an outside connector of the pipe joint is disposed so as to face to the direction perpendicular to the dash panel, whereby an outside brake pipe can be disposed perpendicularly to the dash panel.

Still further, in the present invention, the pipe joint can be fixed to the vehicle body panel via a sealing member using a pair of bolts, and the paired bolts can be arranged on a diagonal line.

DETAILED DESCRIPTION OF PREFERRED EMBODIMENTS

A joint construction for a brake pipe in accordance with an embodiment of the present invention will now be described with reference to the accompanying drawings.

Figure 1:
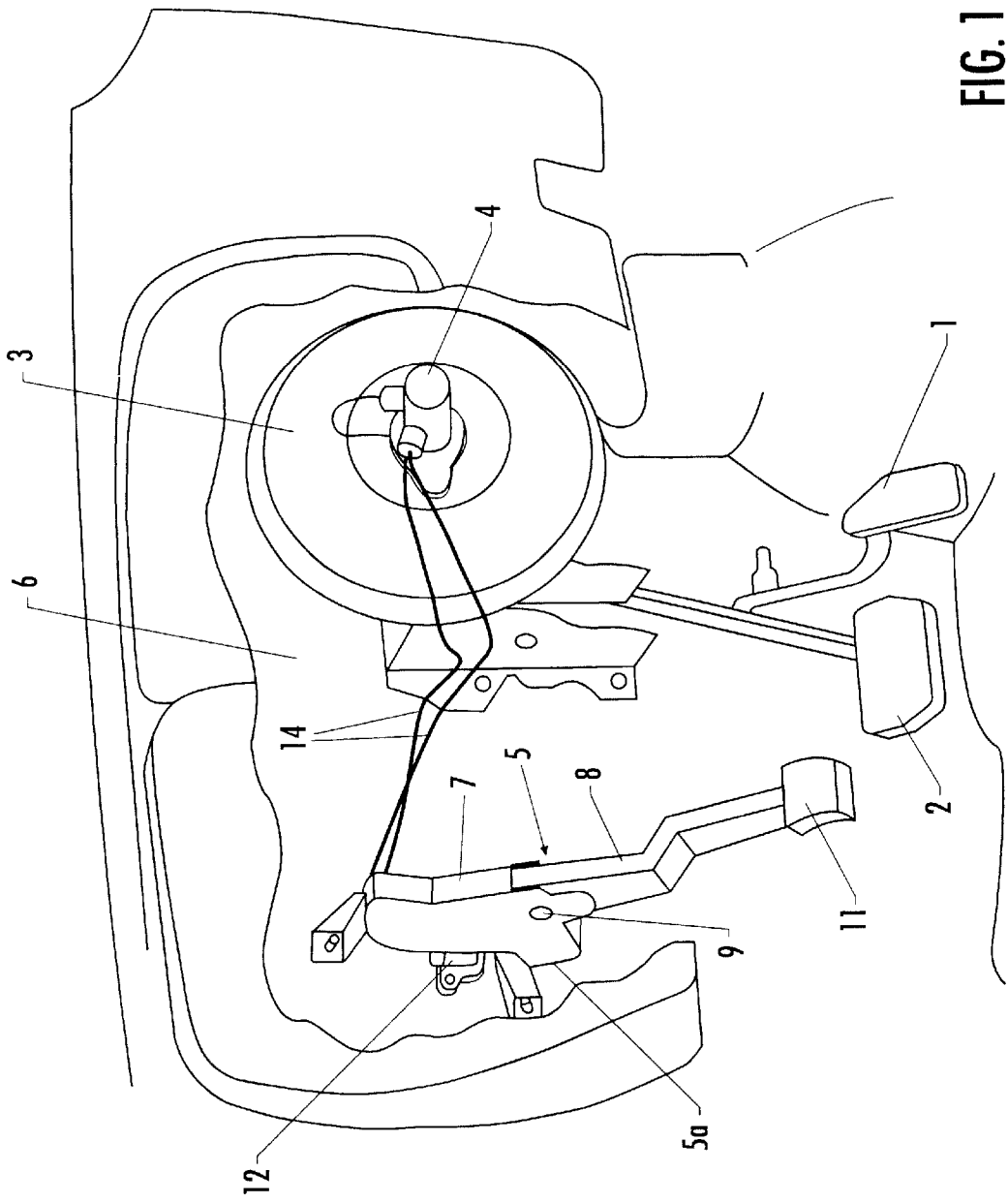
FIG. 1 is a perspective view, partially cut away, showing the vicinity of a cabin-side foot parking brake of a motor vehicle using a joint construction for a brake pipe in accordance with an embodiment of the present invention.

FIG. 1 shows a portion in front of a driver seat viewed from the cabin side of a cab over type motor vehicle using the joint construction for a brake pipe in accordance with the present invention. In front of the driver seat, an accelerator pedal 1 and a brake pedal 2 are disposed. This cab over type vehicle is provided with a brake booster 3 and a master cylinder 4 on the cabin side. Also, this vehicle is provided with a foot-type foot parking brake, and a control unit of the foot parking brake is disposed around the driver's foot.

Figure 2:
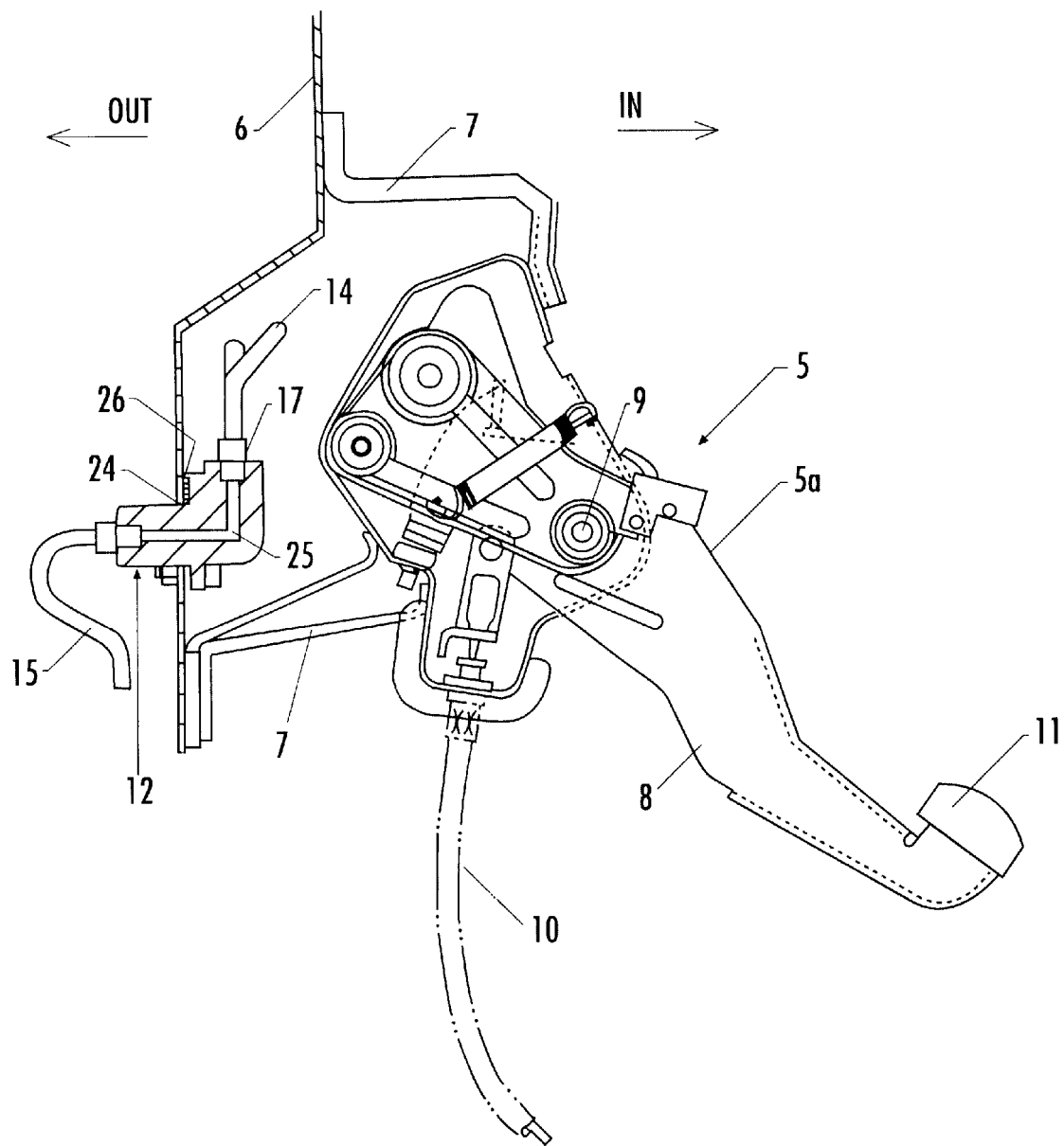
FIG. 2 is a sectional view in which an attachment portion of a control unit of the foot parking brake shown in FIG. 1 is viewed from the side of the vehicle.
Figure 3:
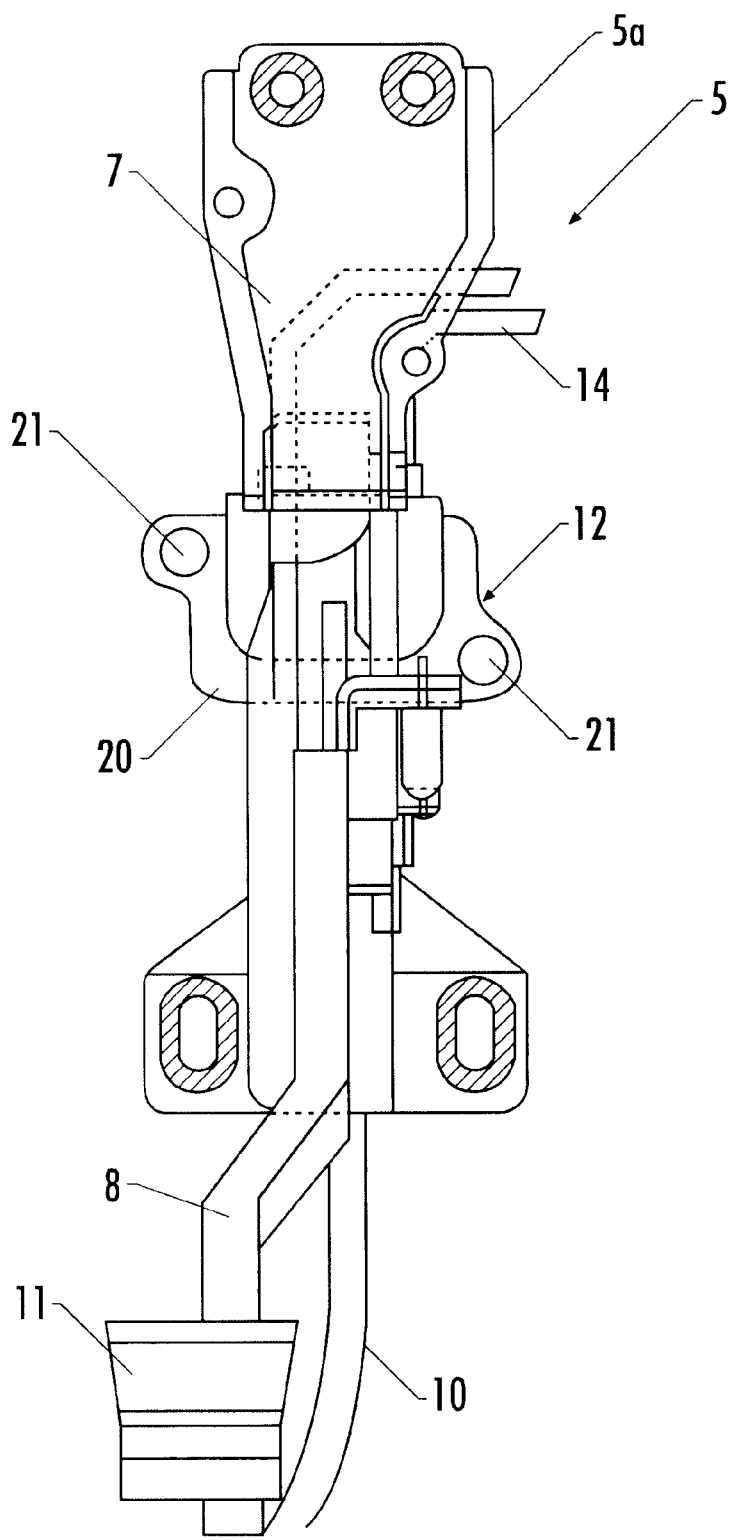
FIG. 3 is a front view in which a control unit of the foot parking brake shown in FIG. 1 is viewed from the cabin side.

FIGS. 2 and 3 show a control unit 5a of the foot parking brake 5. The foot parking brake is attached to an attachment bracket 7 fixed to a dash panel 6 for separating the inside of the cabin (IN side) from the outside of the cabin (OUT side).

An arm 8 of the control unit 5a is pivotally supported so as to be turnable around the axis of rotation 9. On the upper end side of one end of the arm 8 is provided a parking cable 10, and on the other side thereof is provided a pedal 11. On the front side of the attachment bracket 7 and the control unit 5a of foot parking brake with respect to a vehicle body, a connection joint 12 is installed.

Figure 4:
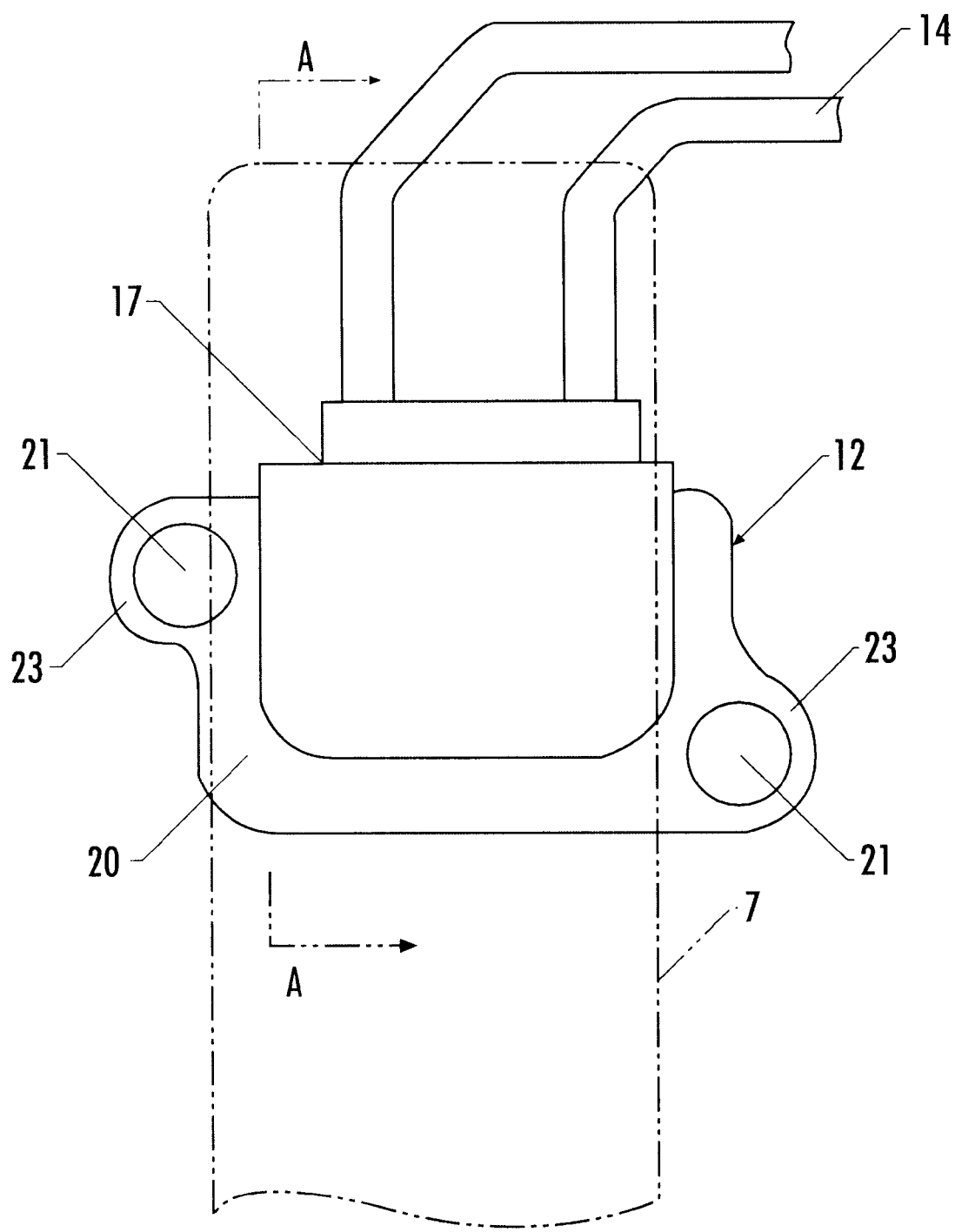
FIG. 4 is a front view in which a connection joint for a brake pipe in accordance with the embodiment of the present invention is viewed from the cabin side.
Figure 5A:
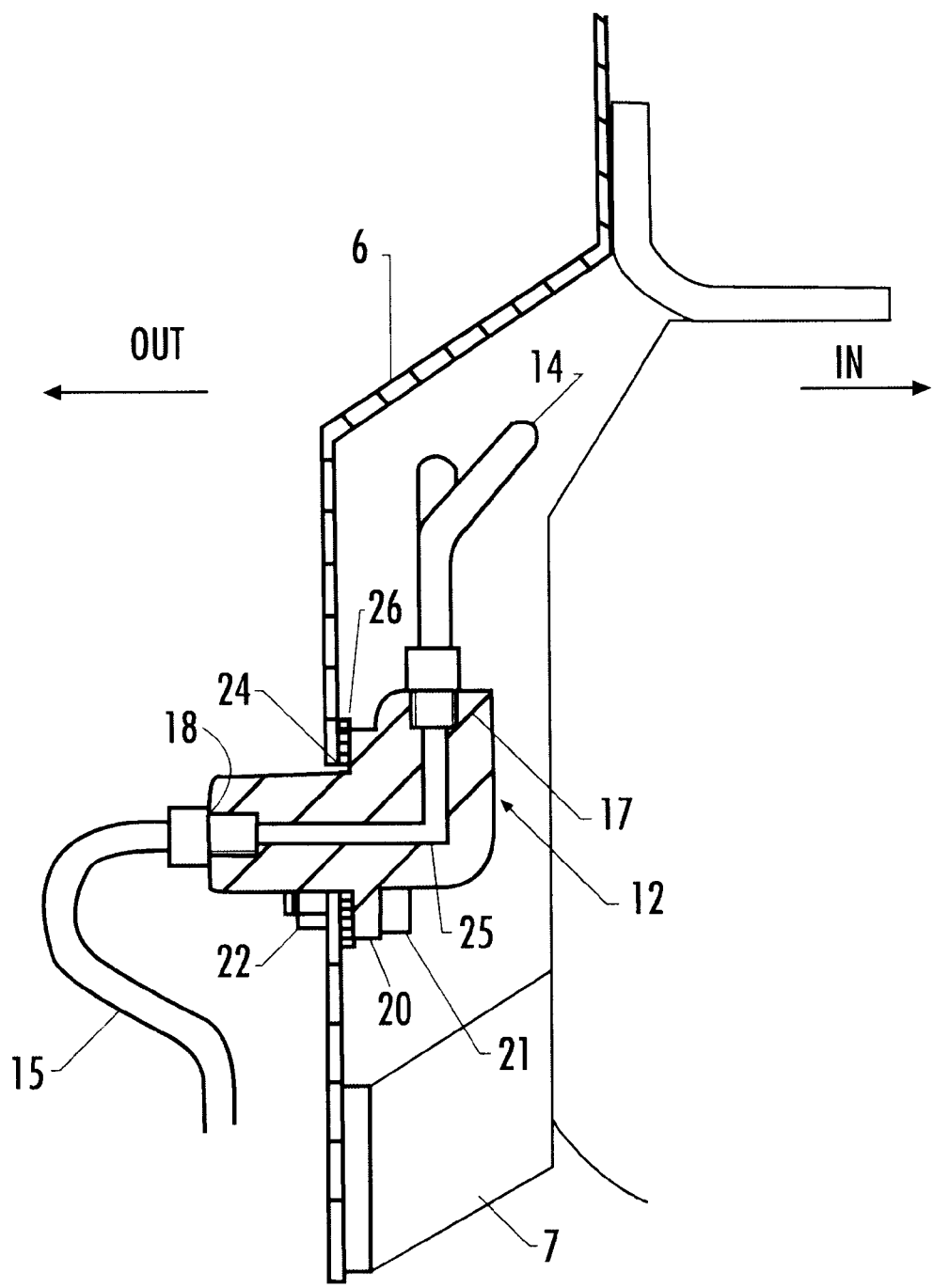
FIG. 5A is a sectional view in which the connection joint shown in FIG. 4 is viewed from the side of the vehicle.
Figure 6:
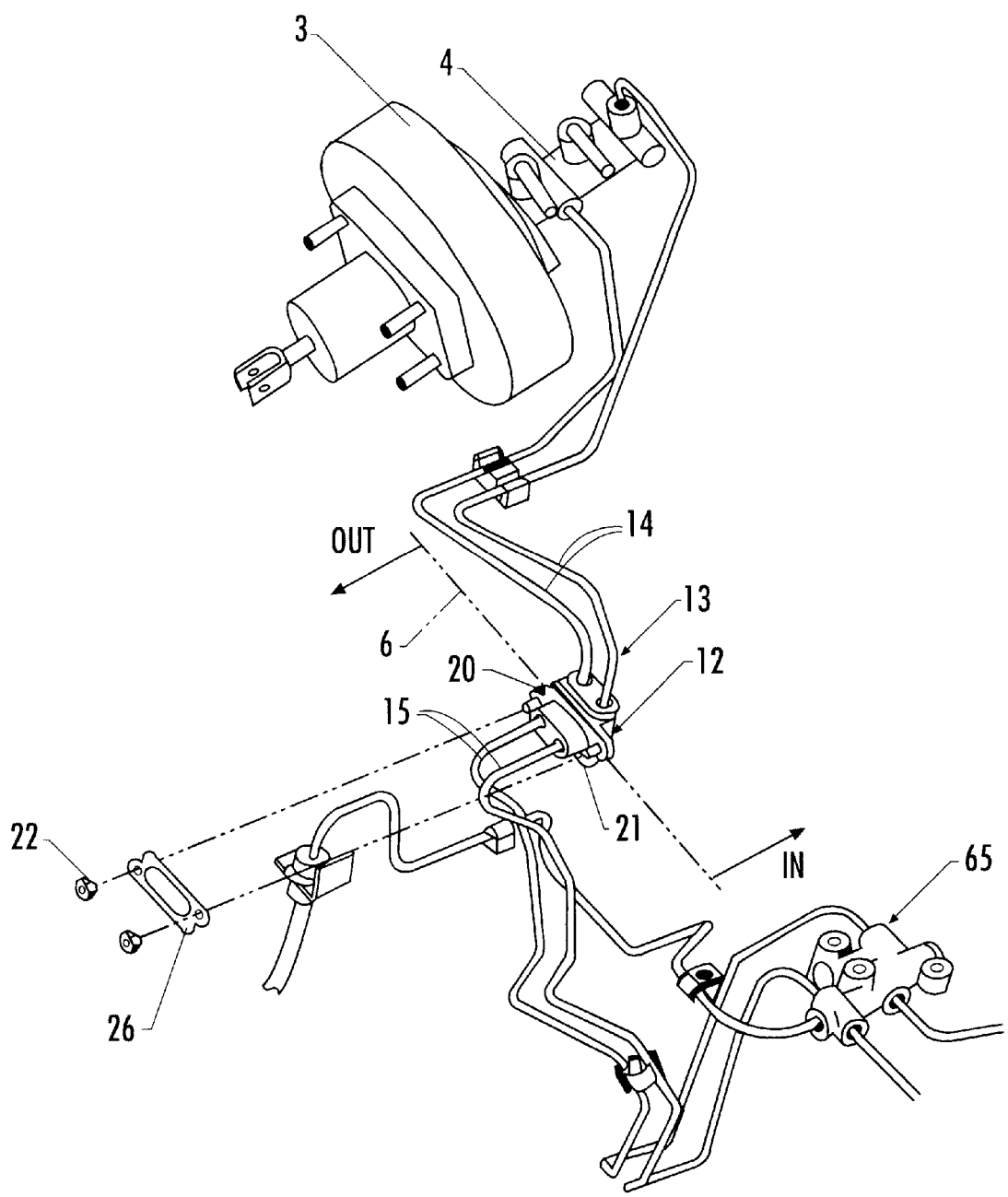
FIG. 6 is a piping view showing a system of brake piping connected to the connection joint shown in FIG. 4.
Figure 7:
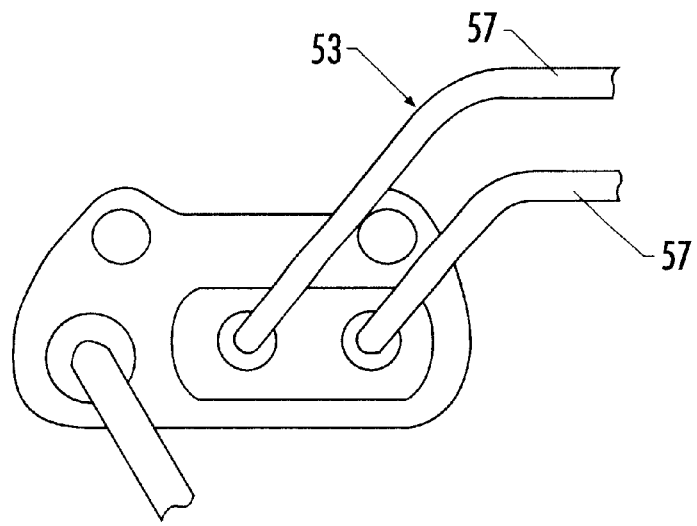
FIG. 7 is a front view in which a connection joint for a brake pipe in a conventional example is viewed from the cabin side.
Figure 8:
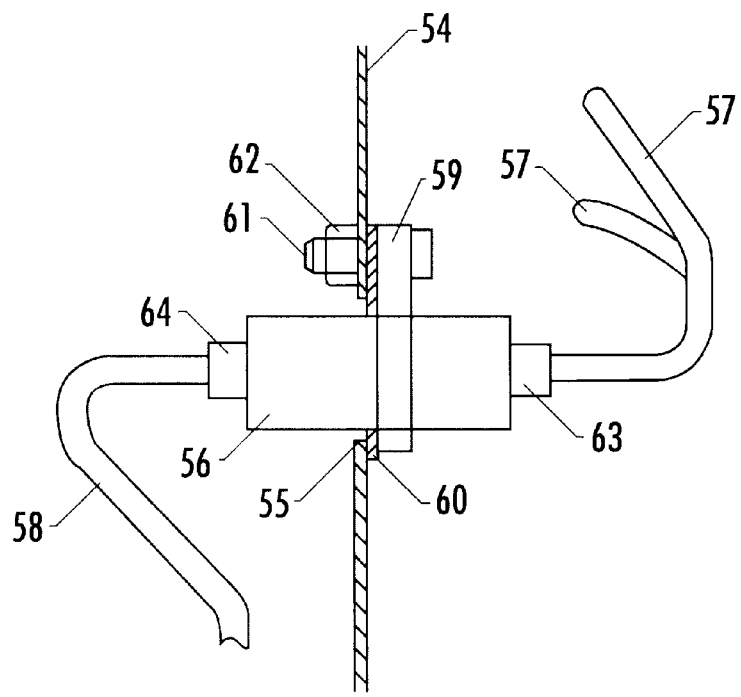
FIG. 8 is a sectional view in which a connection joint for the brake pipe in the conventional example is viewed from the side of the vehicle.
Figure 9:
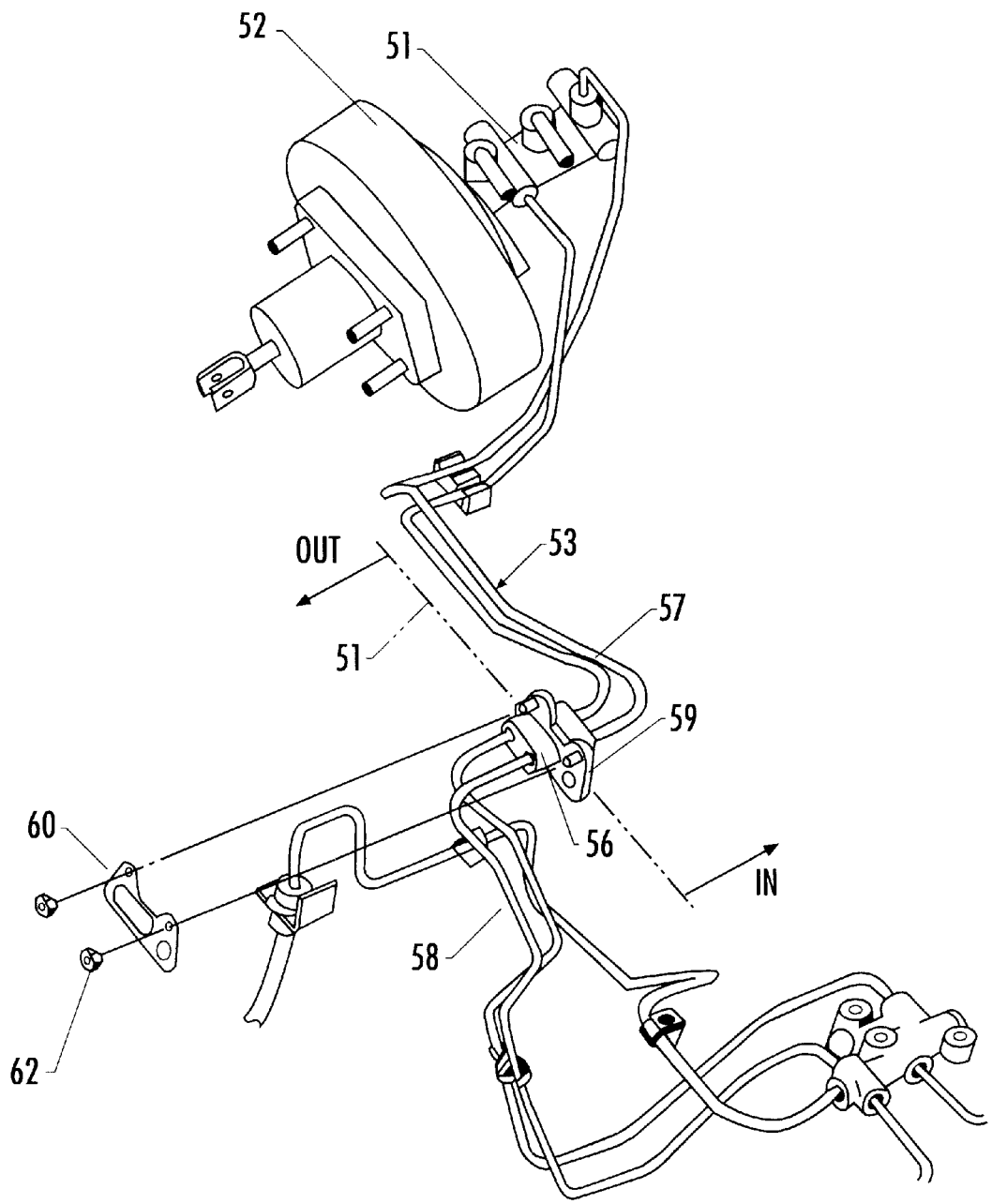
FIG. 9 is a piping view showing a route of brake piping in the conventional example.

FIGS. 4 and 5A are enlarged views of the connection joint 12. The connection joint 12, having an L-shaped cross section, is installed to the dash panel 6 erected vertically to separate the cabin from the outside of the cabin. To the connection joint 12, of brake pipes 13 shown in FIG. 6, a pair of cabin-side brake pipes 14 disposed on the IN side and outside brake pipes 15 disposed on the OUT side are connected.

Of these brake pipes, the cabin-side brake pipes 14 are disposed between the master cylinder 4 and the connection joint 12, and one end thereof is connected to the connection joint 12. The connection joint 12 is disposed in such a manner that a cabin-side connector 17 of the connection joint 12 faces to the direction in which the dash panel 6 extends in the state in which the connection joint 12 is installed to the dash panel 6. The direction of the cabin-side connector 17 may be any direction in which the dash panel 6 extends, upward, downward, leftward, or rightward. In this embodiment, the cabin-side connector 17 is disposed so as to face to the upward direction.

Also, the outside brake pipes 15 are disposed between the connection joint 12 and a proportioning valve 65, and one end thereof is connected to the connection joint 12. An outside connector 18 of the connection joint 12 is disposed so as to be substantially perpendicular to the direction in which the dash panel 6 extends, that is, so as to face to the vehicle front side.

The connection joint 12 is fitted with a pair of bolts 21 which penetrate screw holes (not shown) formed in the dash panel 6, and is fixed to the dash panel 6 by using nuts 22. As shown in FIG. 4, attachment portions 23 for the bolt 21 are projected to the outside, and are disposed on a diagonal line of a mounting flange 20 having a substantially rectangular shape. The attachment portions 23 for the bolt 21 are located on the diagonal line in this manner, or may be located at point symmetrical positions with respect to the center of the mounting flange 20. Also, the connection joint 12 is formed with the mounting flange 20 projecting downward along the surface of the dash panel 6, and a sealing packing 26 is disposed on the face of the mounting flange 20. The connection joint 12 is mounted to the dash panel 6 so as to penetrate a through hole 24 formed in the dash panel 6.

As shown in FIG. 5A, the connection joint 12 forms an L-shaped passage 25 along the L-shaped cross section thereof. The cabin-side brake pipes 14 are laid out in such a manner as to be substantially in parallel with the dash panel 6 by locating the connection end of the cabin-side brake pipe 14 on the side of the connection joint 12 close to the surface of the dash panel 6 to which the connection joint 12 is attached. Also, the outside brake pipes 15 are disposed in such a manner that the connection end of the outside brake pipe 15 on the side of the connection joint 12 is once extended to the vehicle front side so as to be substantially perpendicular to the dash panel 6, being curved downward, and is extended along the OUT side of the surface of the dash panel 6.

The connection joint 12 is disposed in front of the foot parking brake 5 and at a position where the foot parking brake 5 and the cabin-side brake pipes 14 lap on each other on the cabin side of the dash panel 6.

Figure 5B:
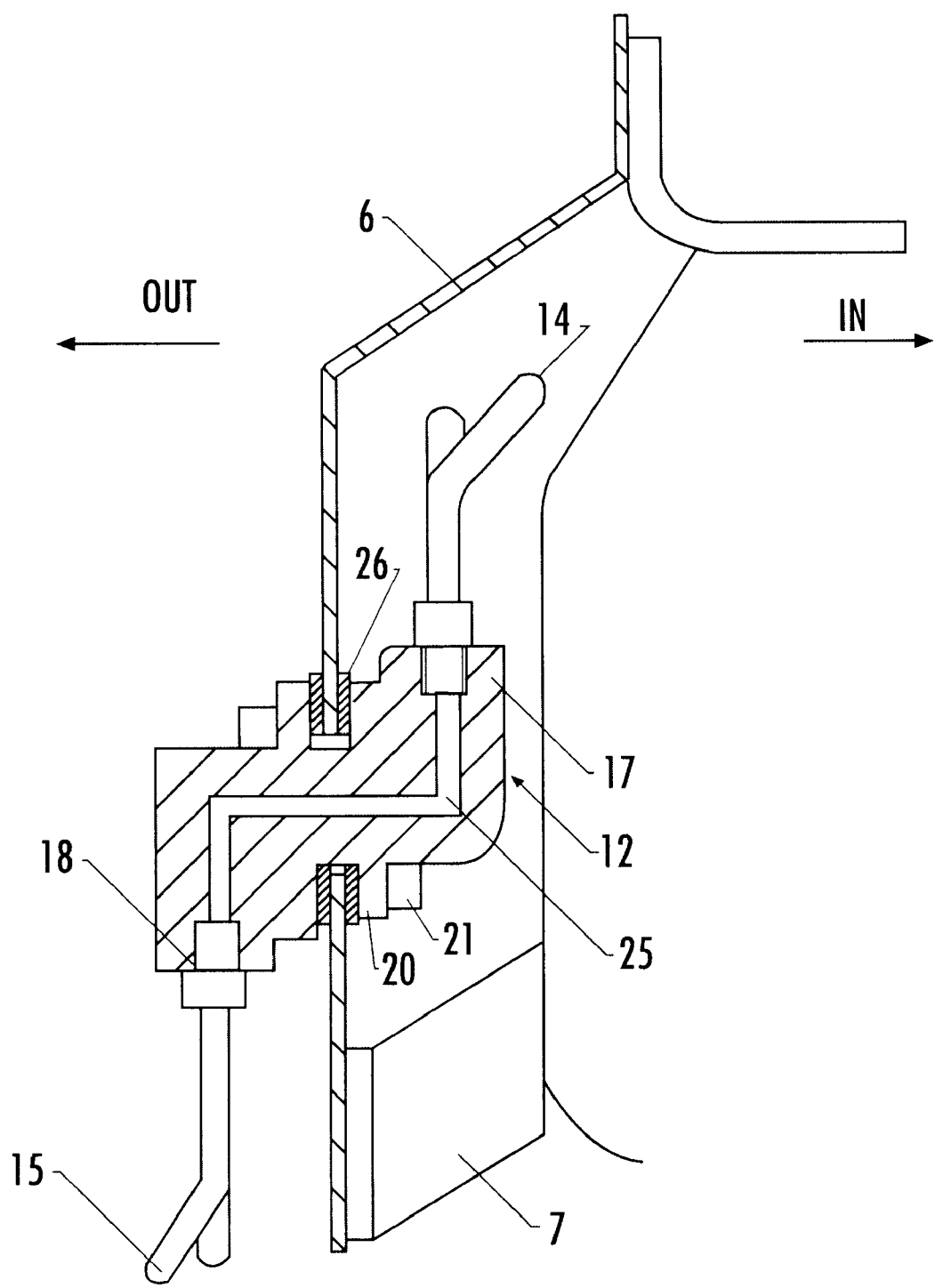
FIG. 5B is sectional view illustrating an alternative embodiment of a connection joint as viewed from the side of the vehicle.

Since this embodiment is configured as described above, the cabin-side brake pipes 14 can be disposed along the surface of the dash panel 6 right from the end of the connection joint 12. Therefore, unlike the conventional construction, it is unnecessary for the cabin-side brake pipes 14 to be projected once to the cabin side before being disposed along the surface of the dash panel 6, so that a space can be provided accordingly. Thereupon, although it has conventionally been difficult to arrange the control unit 5a of the foot parking brake at the rearward of the connection joint 12, such arrangement can be accomplished by applying the present invention. In this embodiment, the connection joint 12 is formed into an L shape in cross section, and only the cabin-side connector 17 is disposed along the surface of the dash panel 6. However, the connection joint 12 may be formed into a U shape or a crank shape in cross section, such as illustrated in FIG. 5B, so that not only the cabin-side connector 17 but also the outside connector 18 on the outside of the cabin are disposed along the surface of the dash panel 6.

Also, by disposing the attachment portions 23 for the bolt 21 so as to be located on the diagonal line of the mounting flange 20 having a substantially rectangular shape, the sealing property of the packing 26 can be increased despite the fact that the paired bolts 21 and nuts 22 provide a small number of attachment locations.

The above is a description of an embodiment of the present invention. Needless to say, the present invention is not limited to this embodiment, and various changes and modifications can be made based on the technical concept of the present invention.

For example, although the connection joint 12 is located at a position a little closer to the center of the dash panel 6 as shown in FIG. 1 in the above-described embodiment, the connection joint 12 may be located at any position on the dash panel 6.

Also, in the above-described embodiment, as shown in FIG. 2, the lower-side portion of the dash panel 6 corresponding to the attachment portion of the connection joint 12 is projected to the outside of the cabin, and the connection joint 12 is installed in the projected portion of the dash panel 6. However, the dash panel 6 may appropriately be formed into a shape such as to correspond to a vehicle-side structural member disposed near the connection joint 12. Even if the dash panel 6 has a flat plate shape, the present invention can be applied.

Also, regarding the vehicle-side structural member, the connection joint may be disposed at a position where not the control unit 5a of the foot parking brake but a structural member such as a clutch pedal attachment bracket is disposed.

As described above, according to the joint construction for a brake pipe in accordance with the present invention, in the joint construction for a brake pipe, comprising a pipe joint which penetrates a vehicle body panel and is installed to the vehicle body panel; and brake pipes connected to the cabin-side connector of the pipe joint and the outside connector thereof, of the cabin-side connector and the outside connector of the pipe joint, at least either one of the connectors is provided so as to face to the direction parallel with the vehicle body panel, and the brake pipe connected to the connector is disposed along the surface of the vehicle body panel. Therefore, a space is not needed around the connector of the joint, and the brake pipe can be laid out in a tight space.

Also, in the present invention, the vehicle body panel is the dash panel, the cabin-side connector of the pipe joint is provided so as to face to the direction parallel with the dash panel and the dash panel is provided with the control unit of the foot parking brake, and the control unit is disposed just at the rear of the pipe joint. Therefore, a large mounting space for the joint is not needed around the dash panel in the portion where the joint is disposed.

Further, in the present invention, the pipe joint is formed into an L shape in cross section so that an outside connector is disposed so as to face to the direction in which the brake pipe and the dash panel intersect at right angles.

Still further, in the present invention, the pipe joint is fixed to the vehicle body panel via a sealing member using a pair of bolts, and the paired bolts are arranged on a diagonal line. Therefore, the sealing property of the sealing member is improved.

What is claimed is:

1. A joint construction for a brake pipe, comprising a pipe joint which penetrates a dash panel and is mounted to said dash panel; and brake pipes connected to connectors of said pipe joint, wherein at least one of said connectors of said pipe joint is a cabin side connector parallel to said dash panel and wherein said dash panel is provided with a control unit of a foot parking brake positioned to form a space between said dash panel and said control unit, whereby said pipe joint is mounted to said dash panel so as to be located in said space.

2. The joint construction for a brake pipe according to claim 1, wherein said pipe joint has an L shape cross section so that the other connector of said pipe joint outside of a cabin is perpendicular to said dash panel, and connects an outside brake pipe perpendicular to said dash panel.

3. The joint construction for a brake pipe according to claim 1, wherein said pipe joint is fixed to said dash panel via a sealing member using a pair of bolts, and said paired bolts are arranged on a diagonal line.

4. The joint construction for a brake pipe according to claim 1, wherein the other of said pipe joint connectors is outside of a cabin and is parallel to the surface of said dash panel, and said brake pipe connected to said connector outside of a cabin is disposed along the surface of said dash panel.

* * * * *